(12) United States Patent
Lynas et al.

(10) Patent No.: US 9,487,081 B2
(45) Date of Patent: Nov. 8, 2016

(54) AIRCRAFT FUEL TANK SYSTEM

(75) Inventors: Christopher Lynas, Bristol (GB);
Peter William James, Bristol (GB);
Keith Macgregor, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 645 days.

(21) Appl. No.: 12/868,904

(22) Filed: Aug. 26, 2010

(65) Prior Publication Data
US 2011/0056970 A1    Mar. 10, 2011

(30) Foreign Application Priority Data

Sep. 4, 2009 (GB) ................... 0915363.6
Apr. 29, 2010 (GB) ................... 1007163.7

(51) Int. Cl.
| B64D 1/00 | (2006.01) |
| B60K 15/035 | (2006.01) |
| B64D 37/10 | (2006.01) |
| B64D 37/32 | (2006.01) |

(52) U.S. Cl.
CPC .......... B60K 15/035 (2013.01); B64D 37/10 (2013.01); B64D 37/32 (2013.01); *B64D 2700/62447* (2013.01)

(58) Field of Classification Search
CPC .............. B60K 15/035; B60K 15/04; B60K 15/03504; B64D 2700/62456–2700/62464; F16K 24/04; F16K 17/00; F16K 17/16; A62C 4/00; F28F 9/0231; B65D 90/34
USPC ............ 220/562, 745, 746; 137/15.1, 587; 123/516; 244/135 R
See application file for complete search history.

(56) References Cited

U.S. PATENT DOCUMENTS

| 1,638,434 | A | * | 8/1927 | Curme, Jr. et al. ............. 62/46.1 |
| 2,637,513 | A | * | 5/1953 | Wallen ....................... 244/135 R |
| 3,371,497 | A | * | 3/1968 | Singleton ...................... 62/46.1 |
| 6,216,791 | B1 | | 4/2001 | Alhamad |

FOREIGN PATENT DOCUMENTS

| EP | 1591359 | 11/2005 |
| GB | 2008521 | 6/1979 |

OTHER PUBLICATIONS

UK Search Report for GB1007163.7 issued Aug. 11, 2010.
UK Search Report for GB0915363.6 issued Dec. 31, 2009.

* cited by examiner

*Primary Examiner* — Fenn Mathew
*Assistant Examiner* — Kevin Castillo
(74) *Attorney, Agent, or Firm* — Hauptman Ham, LLP

(57) ABSTRACT

An aircraft fuel tank system is disclosed in which a vent tank is provided with an ullage vent for use in combination with an eternal flamer barrier means during a refuelling process.

10 Claims, 5 Drawing Sheets

AIRCRAFT FUEL TANK SYSTEM

RELATED APPLICATIONS

The present application is based on, and claims priority from, British Application Number 0915363.6 filed Sep. 4, 2009, and British Application Number 1007163.7 filed Apr. 29, 2010, the disclosures of which are hereby incorporated by reference herein in their entirety.

FIELD OF INVENTION

The present invention relates to an aircraft fuel tank system.

BACKGROUND OF THE INVENTION

Fuel tank systems for aircraft commonly comprise one or more fuel tanks and a vent tank. The vent tank may also be referred to as a surge tank. The vent tank is arranged to provide venting means to vent the fuel tanks to atmosphere. Vent tanks are arranged to allow air to flow from atmosphere into the fuel tanks as they are drained and to allow air, fuel vapour or inerting gasses or a mixture of these to flow out of the tanks to atmosphere as the tanks are filled. In addition, during such fill or drain operations, vent tanks are also commonly required to equalize pressures in normal operation due to ambient pressure changes.

Vent tanks are commonly arranged with a predetermined liquid fuel storage capacity. This capacity provides storage for liquid fuel forced from the fuel tanks and vent system into the vent tank, for example, as a result of an aircraft manoeuvre or overfilling of the fuel tanks during refuelling of the aircraft. While vent tanks are commonly arranged with means for returning such surges of fuel to the fuel tanks in a controlled manner, if the liquid fuel capacity of the vent tank is exceeded the fuel is vented to atmosphere.

One problem with such surges of liquid fuel is that they may be at a relatively high pressure during filling. If such pressure is not properly vented then the fuel tank system may be physically damaged. This is a particular problem if the fuel tank system comprises an integral part of the aircraft structure. The problem may be exacerbated when fuel is cold and thus more viscous and therefore more resistant to flow through the venting system.

Another problem exists in that fuel storage space in an aircraft is limited and valuable. Vent tanks may be located in areas that are not suitable for fuel storage and generally need to be as space efficient as possible while providing the required vent capacity. For example, vent tanks are commonly located in the wing tips of an aircraft where space, particularly depth, is restricted.

SUMMARY OF THE INVENTION

An embodiment of the invention provides an aircraft fuel tank system comprising:
a vent tank comprising a first ullage vent and an inlet from one or more fuel tanks;
a vent pipe arranged to provide fluid communication between the ullage of the vent tank and the ullage vent;
flame barrier means arranged within the vent pipe arranged as a barrier to flame fronts entering the vent tank via the vent pipe, the flame barrier means dividing the interior space of the vent pipe into an exterior section between the flame barrier means and the first ullage vent and an interior section between the flame barrier means and the interior of the vent tank;
a second ullage vent operable between a sealed state and an open state in which the second ullage vent is arranged to provide fluid communication between the interior section of the vent pipe and atmosphere; and
coupling means arranged for sealingly coupling an external flame barrier means to the second ullage vent so as to provide fluid communication between the vent pipe and atmosphere via a coupled external flame barrier means.

The second ullage vent may comprise a removable sealing member arranged to seal the second ullage vent in the sealed state and to enable the fluid communication between the interior section of the vent pipe and atmosphere in the open state. The second ullage vent may be manually operable between its sealed and open states. The second ullage vent may be powered between its sealed and open states. The second ullage vent may be operable between its sealed and open states automatically in response to respective coupling or decoupling of an external flame barrier means. The second ullage vent may be lockable in one or more of the states. The sealing means may be removable. The vent pipe may be arranged generally vertically and the first and second ullage vents are arranged within horizontal cross-section of the vent pipe. The ullage vents and vent pipe may be fitted within a single removable hatch in the underside of the vent tank.

An external flame barrier means may be provided for use with the aircraft fuel tank system, the external flame barrier means comprising:
a hollow body member comprising a first port providing coupling means for sealing engagement with the coupling means of the aircraft fuel tank system and a second port providing a vent to atmosphere; and
flame barrier means arranged within the body member so as to provide a barrier to ingress past the first port of a flame front external to the external flame barrier means and to enable egress of liquid fuel from the first port to atmosphere.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
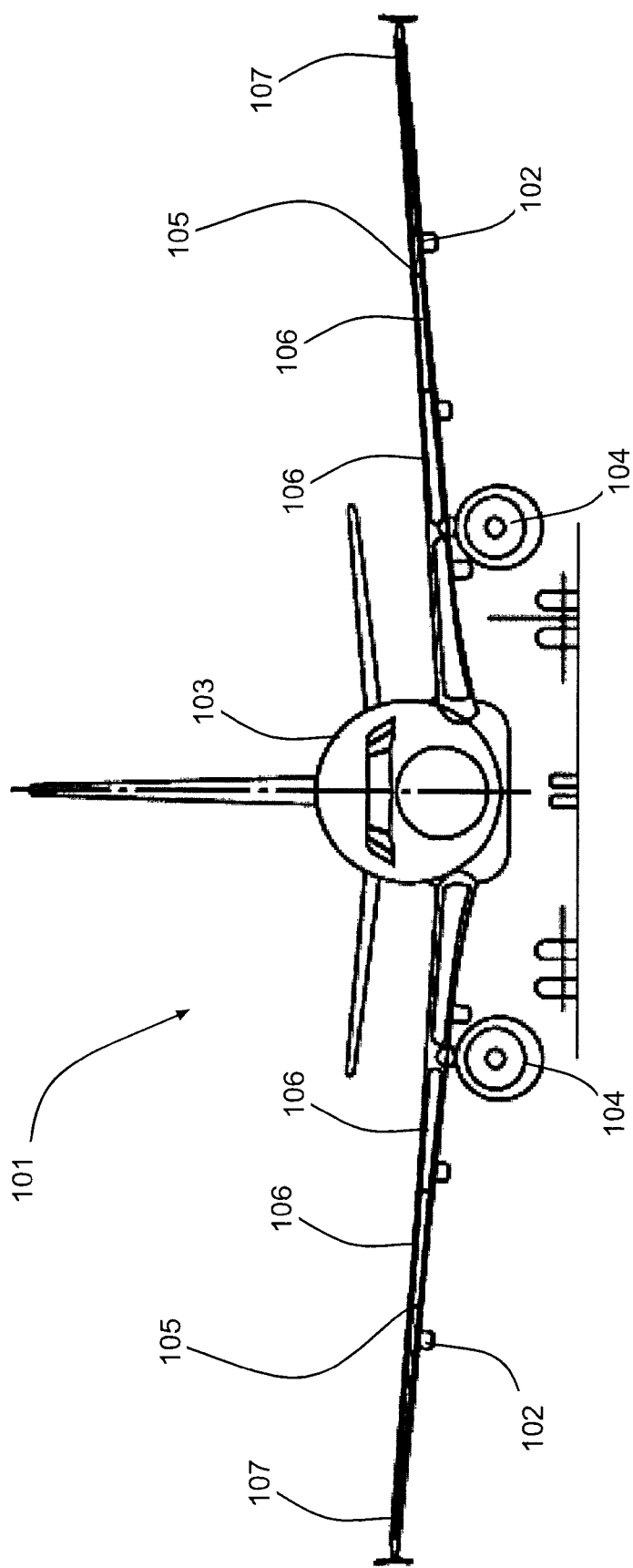
FIG. 1 is a schematic front view of an aircraft.

With reference to FIG. 1, an aircraft 101 comprises a pair of wings 102 faired into a fuselage 103. Each wing 102 carries an engine 104 and part of an internally located fuel tank system 105. The fuel tank system 105 provides fuel to the engines 104. The fuel tank system comprises a set of fuel tanks 106 and two vent tanks 107 each built-in to a respective one of the wings 102. The vent tanks 107 are each located towards the tip of their respective wings 102. The vent tanks 107 are arranged to perform a number of functions. Firstly, the vent tanks 107 vent the ullage of each of the fuel tanks 106 to atmosphere to enable the ingress of air required to equalise negative pressure in the fuel tanks as a result of, for example, fuel being burned by the engines 104 or a decrease in altitude of the aircraft 101. Secondly, the vent tanks 107 vent the ullage of each of the fuel tanks 106 to atmosphere to enable the egress of positive pressure of air, fuel vapour or inerting gasses from the tanks as a result, for example, of an increase in ambient temperature or altitude of the aircraft 101. Thirdly, the vent tanks 107 are arranged to vent excess liquid fuel from the fuel tanks 106 to atmosphere as a result of, for example, exceptional manoeuvres of the aircraft 101 or by overfilling of the fuel tanks 106 during a refuelling process.

Figure 2:
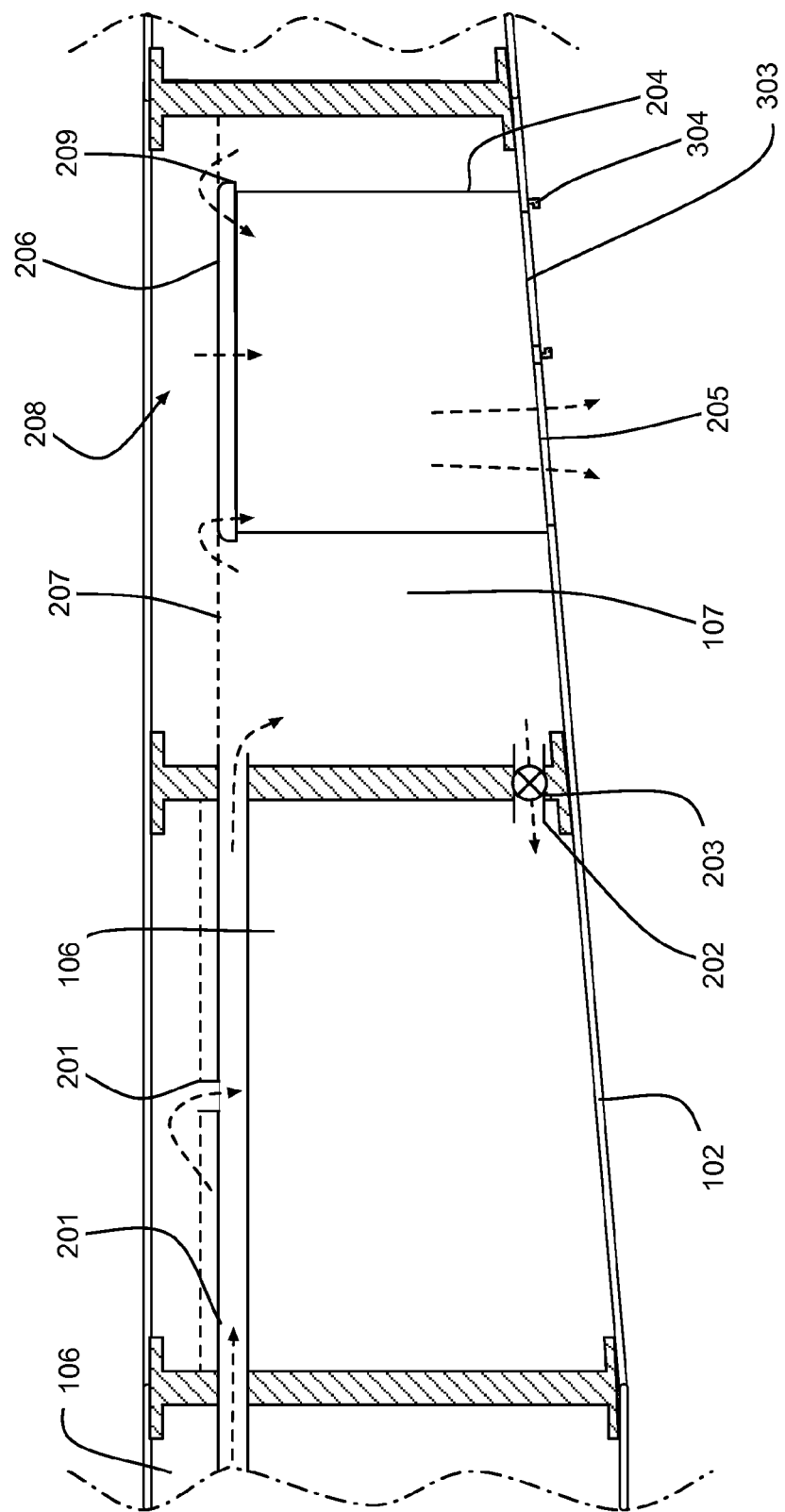
FIG. 2 is a cross-sectional front view of a vent tank in the fuel tank system of the aircraft of FIG. 1.

With reference to FIG. 2, in the present embodiment two fuel tanks 106 and the vent tank 107 are provided by the internal structure of each of the wings 102. The fuel tanks 106 are arranged with a ventilation system comprising a first set of conduits 201 for venting the ullage of each respective fuel tank 106 into the vent tank 107. The fuel and vent tanks 106, 107 are further provided with a fuel return system comprising a second set of conduits 202 controlled by pumps 203 having non-return valves that enable the controlled return of fuel from the vent tank 107 to the fuel tanks 106.

The vent tank 107 further comprises a vent pipe 204 arranged to provide fluid communication between the interior of the vent tank 107 and atmosphere via a first ullage vent 205 positioned in the lower wall of the ullage tank 107 and the aircraft wing 102. In the present embodiment, the vent pipe 204 is cylindrical and arranged substantially vertically within the vent tank 107 when the aircraft 101 is level. The vent pipe 204 has its lower open end in direct fluid communication with the first ullage vent 205. In the present embodiment, the upper open end 206 of the vent pipe 204 is positioned level with the maximum designed liquid fuel level 207 of the vent tank 107. The space in the vent tank 107 above the maximum designed fuel level 207 is the minimal ullage 208. In the present embodiment, the upper end 206 of the vent pipe 204 is provided with a lip 209.

Figure 3:
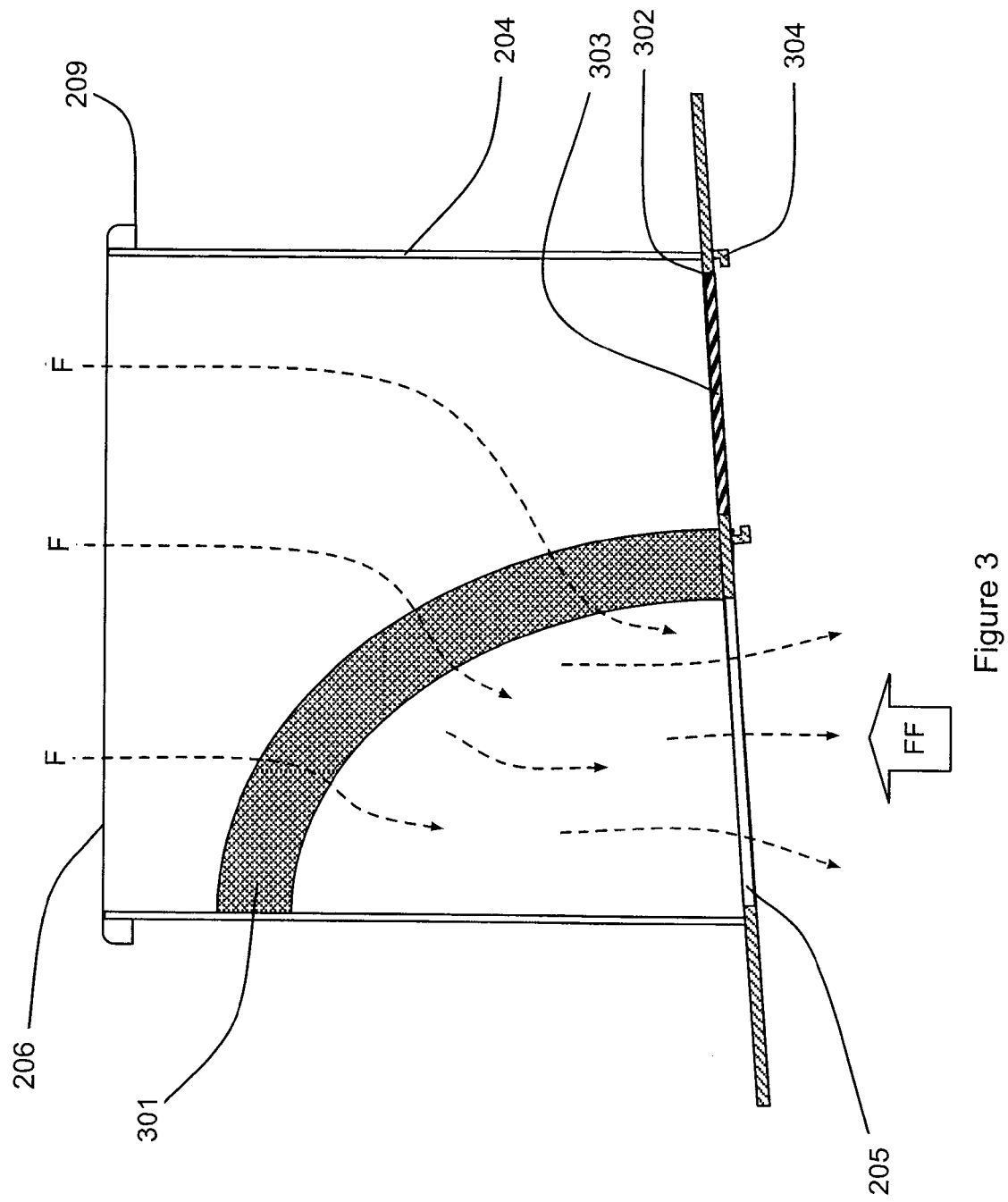
FIG. 3 is a schematic cross-sectional view of the vent pipe in the vent tank of FIG. 2.

With reference to FIG. 3, the vent pipe 204 further comprises a flame barrier means 301 arranged to prevent an external flame front (FF) from entering the vent tank 107 via the first ullage vent 205 and the vent pipe 204. The flame barrier 301 divides the interior space of the vent pipe 204 into an exterior section between the flame barrier 301 and the first ullage vent 205 and an interior section between the flame barrier 301 and the interior of the vent tank 107. In the present embodiment, the flame barrier 301 has a curved vertical cross section. In the present embodiment, a second ullage vent 302 is provided, positioned in the lower wall of the ullage tank 107 and the aircraft wing 102. In the present embodiment, the vent pipe 204 provides a substantially linear flow path between the vent tank 107 and the first and second ullage vents 205, 302. Both the first and second ullage vents 205, 302 are arranged within the horizontal cross-section of the vent pipe 204. The second ullage vent 302 is provided with sealing means in the form of a hatch 303. In FIG. 3, the hatch 303 is illustrated located in the second ullage vent 302. In other words, the second ullage vent 302 is in a sealed state in which the hatch 303 provides a fluid tight seal between the interior if the vent tank 107 and the exterior of the wing 102, that is, atmosphere. In the present embodiment, the second ullage vent 302 further comprises first coupling means 304, in the form of the female part of a bayonet coupling.

Figure 4:
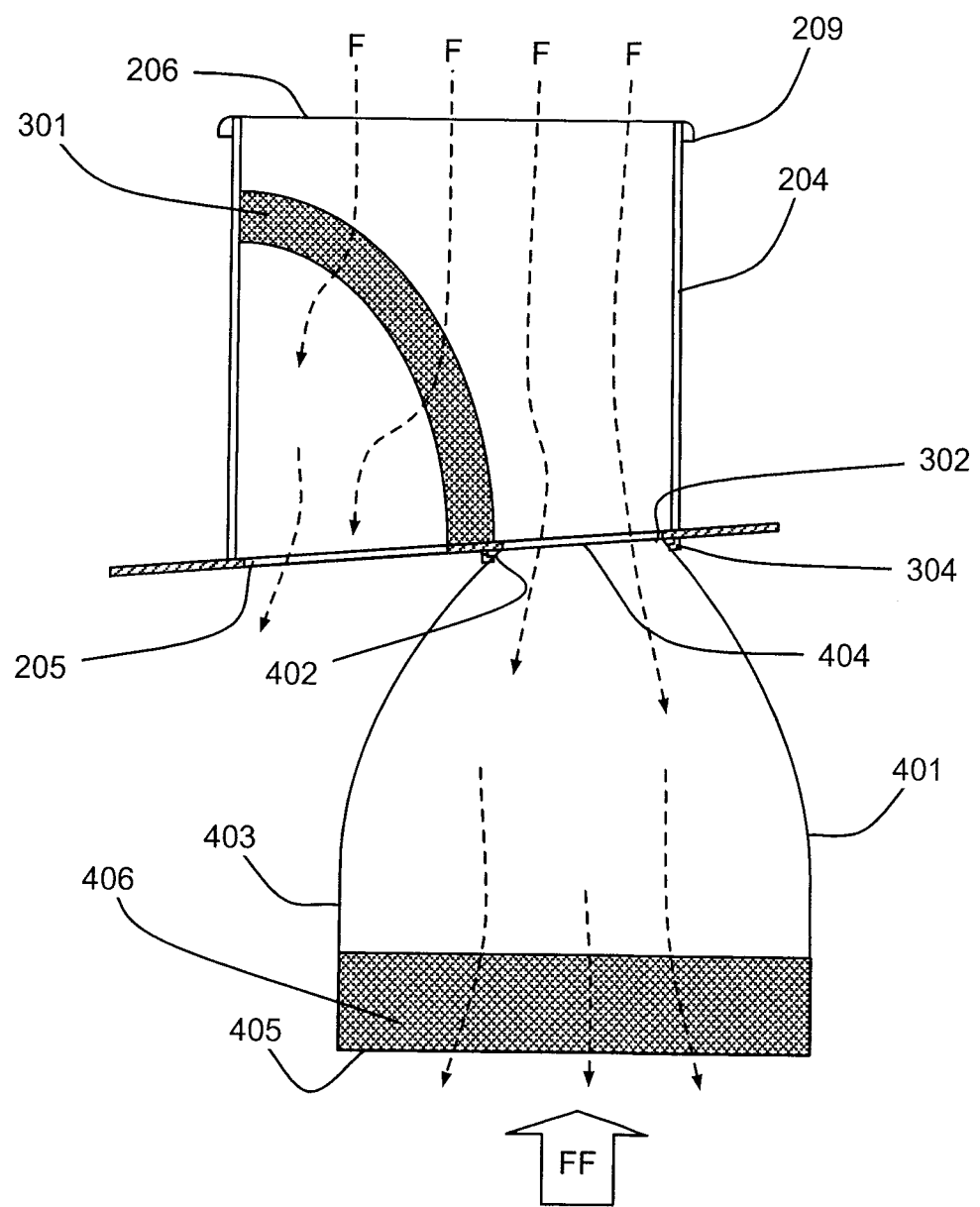
FIG. 4 is a schematic cross-sectional view of the vent pipe in the vent tank of FIG. 2 in combination with an external flame barrier means.

With reference to FIG. 4, removal of the hatch 303 (not shown in FIG. 4) from the second ullage vent 302, enables the connection of an additional external flame barrier means 401. The external flame barrier means 401 comprises a second coupling means 402, in the form of the male part of a bayonet coupling, for engagement with the second ullage vent 302 in its open state. The external flame barrier means 401 further comprises a hollow substantially cylindrical body member 403 having a first and second open ends 404, 405. The first open end 404 is arranged to conform to the second ullage vent 302 and carries the second coupling means 402. The second open end 405 is open to atmosphere. The external flame barrier means 401 further comprises a flame barrier element 406 fixed within the body member 403. The flame barrier element 406 is arranged to provide a flame barrier for preventing ingress, via the external flame barrier means 401, of flame fronts (FF) external to the vent tank 107 while allowing egress (F) of fuel, fuel vapour or other liquids or gasses to atmosphere.

Thus, the vent tanks 107 are arranged for use in two modes. The first mode is provided for venting of the vent tanks 107 when no refuelling or low-rate refuelling is taking place. In this first mode, the second ullage vent 302 is in its closed state 211 and all venting of the vent tank 107 is provided via the vent pipe 204, the flame barrier means 301 and the first ullage vent 205. The second mode is provided for venting of the vent tanks 107 during a high-rate refuelling process. In this second mode, with reference to FIG. 4, the external flame barrier means 401 is coupled to the second ullage vent 302 in its open state as shown in FIG. 4. The coupling between the second ullage vent 304 and the external flame barrier means 401 is arranged to maintain its fluid seal between the coupled parts while fully coupled. Once the external flame barrier means 401 is removed, the hatch 303 is refitted to the second ullage vent 302 to return it to its sealed state.

Figure 5A:
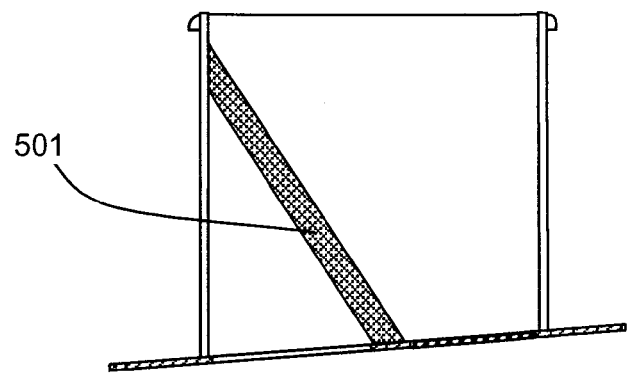
FIGS. 5a & 5b are schematic cross-sectional views of vent pipes in accordance with further embodiments for use in a vent tank in combination with an external flame barrier means.
Figure 5B:
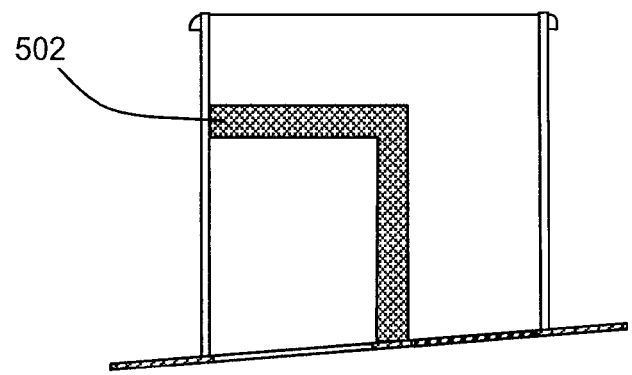

In another embodiment, with reference to FIG. 5a, the flame barrier means 501 has a single linear vertical cross-section. In a further embodiment, with reference to FIG. 5b, the flame barrier means 502 has part box section vertical cross-section.

Figure 6:
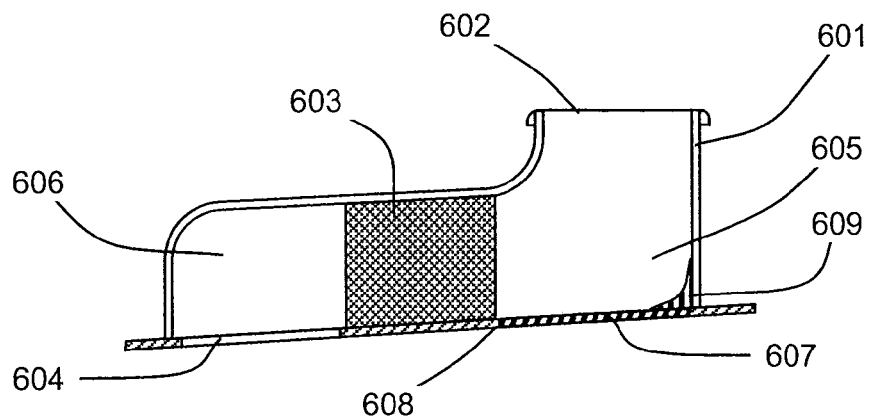
FIG. 6 is schematic cross-sectional view of a vent pipe in accordance with another embodiment for use in a vent tank in combination with an external flame barrier means.

In another embodiment, with reference to FIG. 6, a vent pipe 601 is arranged in a generally horizontal plane as opposed to the generally vertically arranged vent pipes described above. In the present embodiment, the fluid flow between the upper open end 602 of the vent pipe 601 via the flame barrier means 603 to the first ullage vent 604 is turned twice by first and second bends 605, 606 of the vent pipe 601. In the present embodiment, the hatch 607 for sealing the second ullage vent 608 comprises an integral corner element 609 that is removed along with the hatch 607 when an external flame barrier (not shown) is attached to the second ullage vent 608. The removable corner element 609 maximises the size of the second ullage vent 608 when in its open state while maintaining smooth fluid flow around the first corner 605 when the hatch 607 is in place and the second ullage vent 608 is thus in its closed state.

In a further embodiment, the footprint of the vent pipe and ullage vents on the lower wall or floor of the vent tank is arranged to fit within a removable hatch. In addition, the attached the vent pipe and ullage vents are attached to or integral with the hatch. This arrangement facilitates the removal of the vent pipe assembly from the vent tank for inspection or repair.

In another embodiment, the hatch is arranged to open automatically in response to the coupling of an external flame barrier means. The hatch may be opened as a result of the attachment movement of the external flame barrier means. Alternatively, the hatch may be powered open automatically in response to the detection of attachment of an external flame barrier means. The hatch may be arranged to remain attached to aircraft and may be inwardly or outwardly hinged or tethered.

As will be understood by those skilled in the art, the powered or mechanical elements of the embodiments described above may be wholly or partially substituted for any other mechanical or powered mechanism for providing the same function. Actuation may be provided by any suitable combination of suitable methods such as manual, electric hydraulic power. The mechanism may be arranged for control either partially or fully automatically or may be partially or fully manually controlled by ground or onboard personnel.

As will be understood by those skilled in the art, in any of the embodiments described herein, an intermediate conduit such as a hose or pipe may be provided between the ullage vent and the external flame barrier means so as to conduct any liquid fuel flowing from the ullage vent away from the aircraft structure. As will be understood by those skilled in the art, the hatch for the ullage vent may be provided with further locking or retaining means to prevent accidental or unauthorised opening.

As will be understood by those skilled in the art, the coupling means between the external flame barrier means and the ullage vent may be provided by any suitable coupling means such as correspondingly threaded male and female members, push or snap-fit connectors or any other coupling means suitable for carrying fuel.

As will be understood by those skilled in the art, the ullage vent may be provided with an ice screen.

As will be understood by those skilled in the art, the flame barrier means and flame barrier elements may be formed from a conventional flame barrier material such as layered wire mesh. The flame barrier may be formed from any suitable material such as non-woven meshes or may comprise one or more granular or particulate layers. Any surface of one or more of the flame barrier means or elements may be corrugated or be formed with a convoluted cross section. Such corrugations or convolutions may run in any suitable direction through the flame barrier means or elements. For example, the corrugations or convolutions may run radially or circumferentially relative to the central axis of the corresponding external flame barrier means or elements.

As will be understood by those in the art, the ullage vent may be fed by or feed into an aerodynamic duct, such as a NACA (National Advisory Committee for Aeronautics) duct or the like, for providing an aerodynamic interface between the ullage vent and the external surface of the aircraft.

The external flame barrier means in combination with the ullage vent and vent pipe, in accordance with embodiments of the invention, may be arranged so as to provide comparable or greater fluid flow than a given refuelling means/pump. Such arrangements will reduce the risk of the refuelling pump increasing the pressure within the fuel tank system beyond its structural limits and thus avoid damage to the aircraft structure. The external flame barrier means may be arranged for use during high rate refueling, whereas during lower pressure or standard refueling operations only the internal flame barrier means may be utilized.

Embodiments of the invention may enable the vent pipe and flame barrier arrangements to be more compact since the vent pipe need only be capable of the relatively low flow rates required when the aircraft is operating in modes other than the refuelling mode.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the applicant's general inventive concept.

The invention claimed is:

1. An aircraft fuel tank system, comprising:
one or more aircraft fuel tanks holding and supplying aircraft fuel to aircraft engines within said aircraft;
an aircraft surge tank comprising a first ullage vent and an inlet from said one or more aircraft fuel tanks;
a vent pipe arranged to provide fluid communication between the ullage of said surge tank and said ullage vent;
a flame barrier arranged within said vent pipe arranged as a barrier to flame fronts entering said surge tank via said vent pipe, said flame barrier dividing the interior space of said vent pipe into an exterior section between said flame barrier means and said first ullage vent and an interior section between said flame barrier means and the interior of said surge tank;
a second ullage vent operable between a sealed state and an open state in which said second ullage vent is arranged to provide fluid communication between said interior section of said vent pipe and atmosphere; and
a coupling mechanism sealingly coupling an external flame barrier to said second ullage vent so as to provide fluid communication between said vent pipe and atmosphere via the coupled open structured external flame barrier, wherein said external flame barrier is permanently open to fluid flow.

2. An aircraft fuel tank system according to claim 1 in which said second ullage vent comprises a removable sealing member arranged to seal said second ullage vent in said sealed state and to enable said fluid communication between said interior section of said vent pipe and atmosphere in said open state.

3. An aircraft fuel tank system according to claim 1 in which said second ullage vent is manually operable between its sealed and open states.

4. An aircraft fuel tank system according to claim 1 in which said second ullage vent is powered between its sealed and open states.

5. An aircraft fuel tank system according to claim 1 in which said second ullage vent is lockable in one or more of said states.

6. An aircraft fuel tank system according to claim 1 in which said sealing means is removable.

7. An aircraft fuel tank system according to claim 1 in which said vent pipe is arranged substantially vertically and said first and second ullage vents are arranged within horizontal cross-section of said vent pipe.

8. An aircraft fuel tank system according to claim 1 in which said ullage vents and vent pipe are fitted with a single removable hatch in the underside of said surge tank.

9. An aircraft fuel tank system, comprising:
   a surge tank comprising a first ullage vent and an inlet from one or more fuel tanks;
   a vent pipe arranged to provide fluid communication between the ullage of said surge tank and said ullage vent;
   a flame barrier means arranged within said vent pipe arranged as a barrier to flame fronts entering said surge tank via said vent pipe, said flame barrier means dividing the interior space of said vent pipe into an exterior section between said flame barrier means and said first ullage vent and an interior section between said flame barrier means and the interior of said vent tank;
   a second ullage vent operable between a sealed state and an open state in which said second ullage vent is arranged to provide fluid communication between said interior section of said vent pipe and atmosphere; and
   coupling means arranged for sealingly coupling an external flame barrier means to said second ullage vent so as to provide fluid communication between said vent pipe and atmosphere via the coupled open structured external flame barrier means, wherein said external flame barrier is formed from a layered wire mesh material.

10. An aircraft fuel tank system, comprising:
   a surge tank comprising a first ullage vent and an inlet from one or more fuel tanks;
   a vent pipe arranged to provide fluid communication between the ullage of said surge tank and said ullage vent;
   a flame barrier means arranged within said vent pipe arranged as a barrier to flame fronts entering said surge tank via said vent pipe, said flame barrier means dividing the interior space of said vent pipe into an exterior section between said flame barrier means and said first ullage vent and an interior section between said flame barrier means and the interior of said surge tank;
   a second ullage vent operable between a sealed state and an open state in which said second ullage vent is arranged to provide fluid communication between said interior section of said vent pipe and atmosphere; and
   coupling means arranged for sealingly coupling an external flame barrier means to said second ullage vent so as to provide fluid communication between said vent pipe and atmosphere via the coupled open structured external flame barrier means, wherein said external flame barrier is formed from a non-woven mesh material.

* * * * *